Sept. 12, 1967    G. KANTOROWICZ    3,341,733
TRAVELING WAVE TUBE TIME DELAY DEVICE
Filed May 26, 1964    3 Sheets-Sheet 1
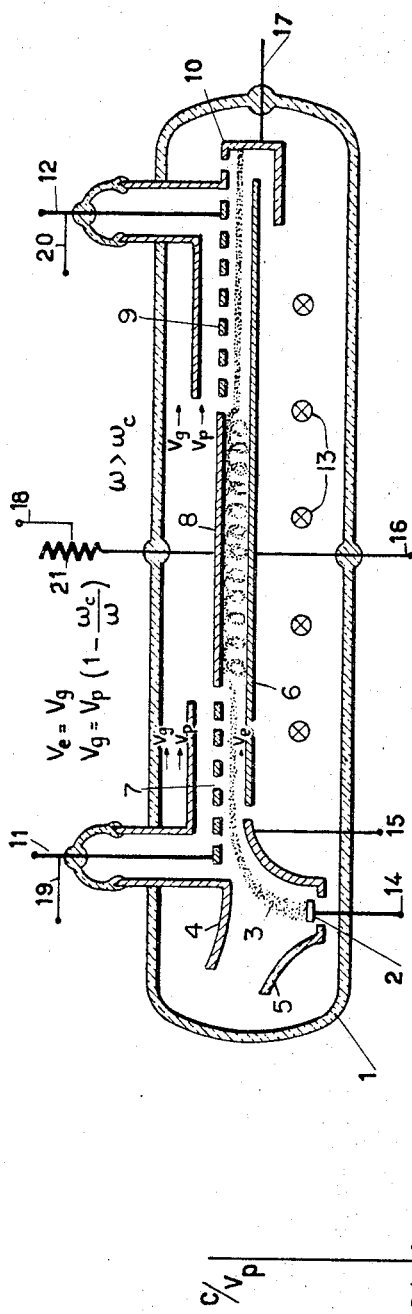
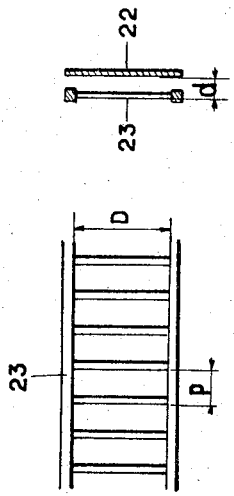
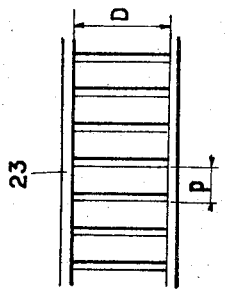
INVENTOR:
G. KANTOROWICZ
BY Paul M. Craig, Jr.
ATTORNEY

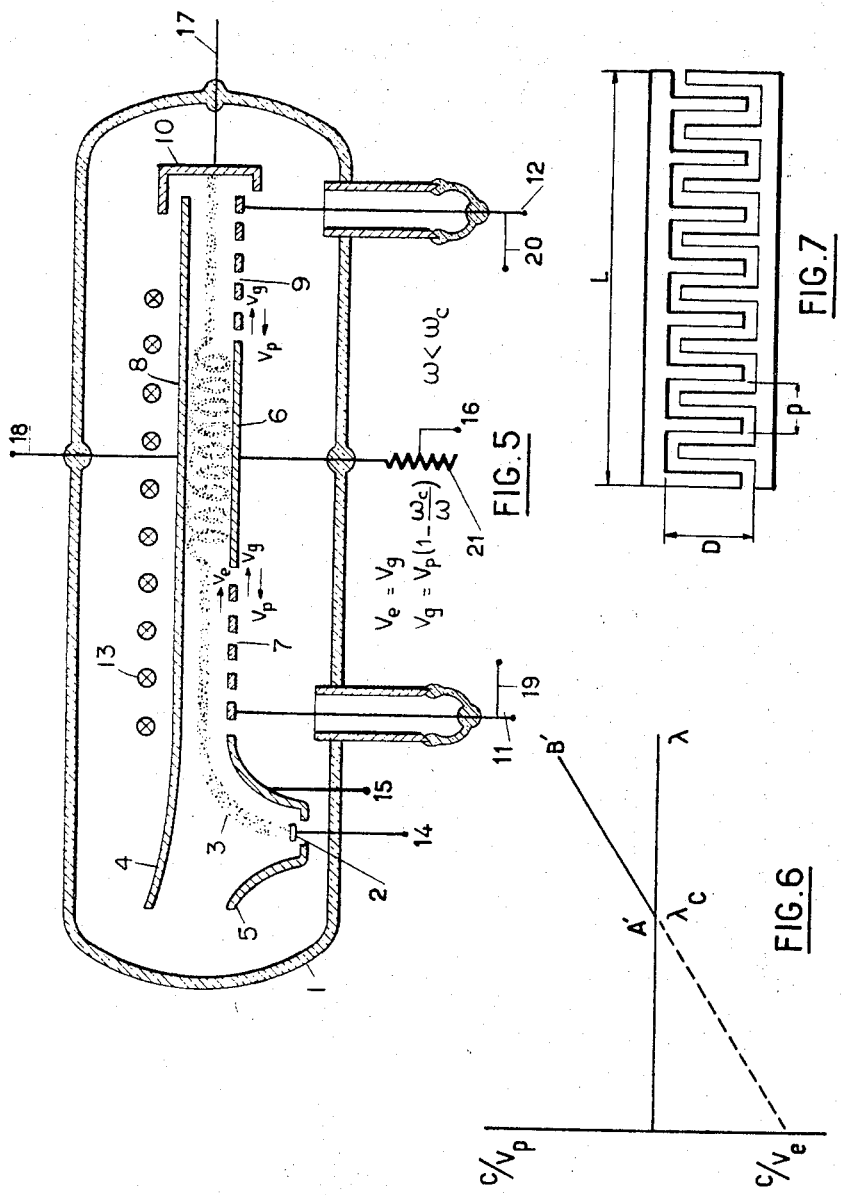

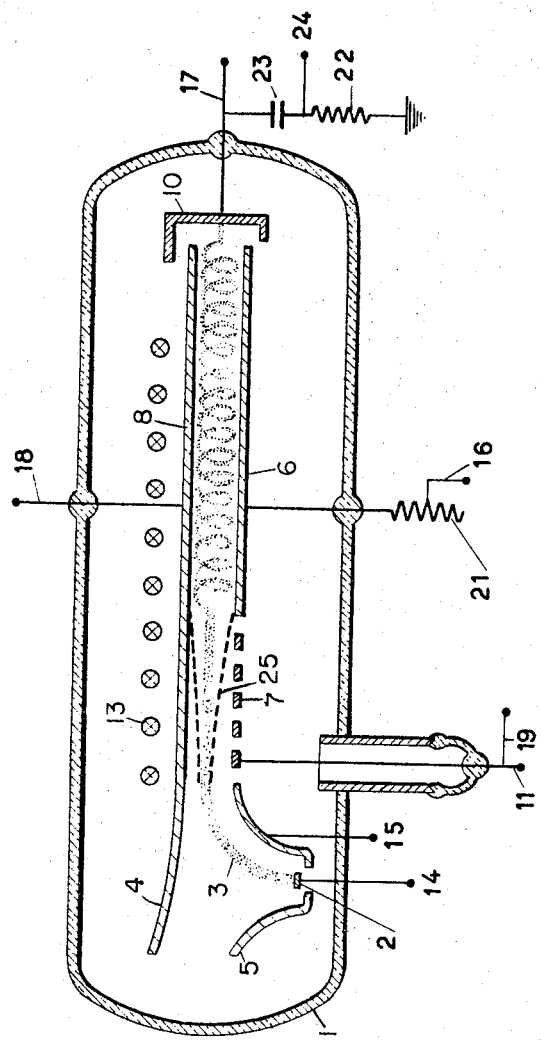

United States Patent Office 3,341,733
Patented Sept. 12, 1967

3,341,733
TRAVELING WAVE TUBE TIME DELAY DEVICE
Gerard Kantorowicz, Paris, France, assignor to CSF-
Compagnie Generale de Telegraphie sans Fil, Paris,
France
Filed May 26, 1964, Ser. No. 370,258
Claims priority, application France, June 12, 1963,
937,794; Feb. 4, 1964, 962,556
12 Claims. (Cl. 315—3.6)

ABSTRACT OF THE DISCLOSURE

An electronic delay line based upon the propagation of fast cyclotron waves impressed upon a beam moving through crossed magnetic and electric fields within a wave guide. Input and output couplings for the delayed signal use distributed couplers on either side of the wave guide, in the form of slow-wave structure sections. The beam velocity through slow-wave structures is adjusted to the group velocity of information propagating therein. The beam velocity within the wave guide is adjustable thereby varying the delay of information.

---

The present invention relates to a delay line, and more particularly to improvements in electronic delay line structures.

It is known that when an electron beam displaces itself perpendicularly to the electric and magnetic fields E and B, respectively, themselves perpendicular to one another, and the movement of the electrons is disturbed by a periodic phenomenon of pulsation $\omega$, the disturbance may itself propagate according to a certain number of waves of electronic oscillation, of which one, referred to as fast cyclotron wave, has a propagation constant $\beta$ related to $\omega$ by the expression:

$$\omega = \omega_c + \beta v_e$$

where $v_e$ is the velocity of translation of the beam, equal to $E/B$;
$\omega_c$ is the gyromagnetic pulsation of the electrons of the beam about the lines of force of the field B, equal to $e/m \cdot B$, where $e$ and $m$ are the charge and the mass of the electron; and
$\beta$ is the propagation constant, equal to $\omega/v_p$, where $v_p$ is the phase velocity of the fast cyclotron wave ($\beta$ being either positive or negative according to the sign of $v_p$ and corresponding to a forward or backward wave).

The group velocity of this wave $$v_g = \frac{d\omega}{d\beta}$$

is obtained immediately by differentiation of the foregoing expression, which gives:

$$v_g = v_e$$

that is, that the fast cyclotron wave propagates with a group velocity equal to the translation velocity of the beam.

By combining the expressions $$\beta = \frac{\omega}{v_p}$$

and $$\omega = \omega_c + \beta v_e$$

one derives:

$$v_p = \frac{v_e}{1 - \frac{\omega_c}{\omega}}$$

that is, the group velocity of the fast cyclotron wave is, with its phase velocity, at the ratio of $$1 - \frac{\omega_c}{\omega}$$

which is positive or negative depending on whether $\omega$ is greater or smaller than $\omega_c$ (the wave being then either forward or backward, respectively), and is generally very much smaller than one.

It has already been proposed to utilize the propagation of the fast cyclotron wave to realize an electronic delay line with very slight losses, and with a delay time that can be readily controlled electronically. To realize this idea, one caused the beam to pass in the crossed fields through a wave guide, itself not propagating the band of the frequency $\omega$, and one has coupled the beam, at the input of the guide, to a modulation source with the frequency $\omega$. One has then introduced into the beam a signal which propagates across the guide in the form of the fast cyclotron wave with the group velocity of this wave, that is, with the translation velocity $v_e$ of the beam which is much smaller than the velocity of the signal in the external circuit. Since the beam was coupled in the prior art construction to the output with a circuit analogous to that at the input, the primitive or original velocity of the signal was re-established thereat; and the signal is collected with a delay of which the duration is equal to the length of the guide divided by the translation velocity of the beam. This delay may thus be regulated by acting on this velocity, that is, on one of the parameters E and B, preferably on the electric field E.

In this known prior art device, the input and output coupling devices were constituted by half-wave length co-axial cavities of which the resonance frequency was equal to $\omega_c$. Notwithstanding the excellent results obtained with the prior art structure as regards the smallness of the losses and ease of adjustment of the delay, this prior art line suffered from a narrow band width which is only of some megacycles.

The object of the present invention is a delay line of this nature presenting a bandwidth which is much greater.

According to the present invention, an electronic delay line is constituted by a tube in which the beam with crossed fields passes through a guide, preferably not propagating the desired band of operating frequency, this beam being coupled to external circuits, at the input and at the output of the guide, by means of delay line portions constructed in such a manner that each satisfies at least with a good approximation and within a large frequency band, the condition that its group velocity is at least approximately constant within this band and that, on a desired space harmonic, the ratio of the phase velocity to the group velocity is substantially equal to $$\frac{1}{1 - \frac{\omega_c}{\omega}}$$

where $\omega$ is the pulsation of the desired operating frequency, and $\omega_c$ the gyromagnetic pulsation of the electrons of the beam in the transverse magnetic field, and that finally the velocity of translation $v_e$ of the said beam is adjusted very substantially to the group velocity of the delay circuit.

One thus obtains, inter alia, a tube structure in which the drift space traversed by a beam with crossed fields is preceded and followed by two spaces comprised between a delay anode and a sole. One will also note that this structure is already known, particularly in the U.S. Patent 2,794,936 to Huber, assigned to the assignee herein, but that its operating conditions are entirely different in the present invention. In this prior patent, with a view to function as amplifier, frequency multiplier, etc., an interaction between the beam and the wave had to take place within the spaces of the delay circuit, and to that effect the beam propagated in synchronism with the phase velocity of the wave injected into the circuit. In the present invention, where there is no question of an interaction, but of a transfer of the information to the beam by the intermediary of the kinetic energy of rotation of the electrons, the translation velocity of the beam is adjusted to be equal to the group velocity, that is, completely out of synchronism with the phase velocity.

Furthermore, the application of the present invention necessitates specially dimensioned delay circuits to satisfy the relationships mentioned above between the group and phase velocities on the desired space harmonic and with the constancy of the group velocity.

According to a further feature of the present invention, one may constitute with the above-described line in accordance with the present invention, a wide band detector, by disposing the utilization impedance into the collector circuit. The external high frequency output circuit, coupled to a beam at the output of the guide, then becomes useless and may be dispensed with.

Accordingly, it is an object of the present invention to provide an electronic delay structure of the type described above which obviates the shortcomings encountered with the prior art constructions.

It is another object of the present invention to provide an electronic delay circuit that offers slight losses, is easy to adjust, yet is capable to operate over a relatively wide band of frequencies.

A further object of the present invention resides in the provision of an electronic circuit of the type described above which may be readily adapted to operate as wide band detector.

These and other objects, features and advantages of the present invention will become more obvious from the following description when taken in connection with the accompanying drawing which shows, for purposes of illustration only, several embodiments in accordance with the present invention, and wherein FIGURE 1 is a schematic transverse cross sectional view of a tube constituting the electronic delay line according to the present invention, adapted to the case of the forward fast cyclotron wave;

FIGURE 2 is a dispersion diagram of the circuits corresponding to FIGURE 1;

FIGURE 3 is a partial plan view of a delay circuit for use in FIGURE 1;

FIGURE 4 is a transverse cross sectional view of the delay circuit of FIGURE 3;

FIGURE 5 is a schematic transverse cross sectional view of a modified tube constituting the electronic delay line according to the present invention, adapted to the case of the backward fast cyclotron wave;

FIGURE 6 is a dispersion diagram of the circuit corresponding to FIGURE 5;

FIGURE 7 is a plan view of a circuit for use in the tube of FIGURE 5; and

FIGURE 8 is a schematic transverse cross sectional view of a tube operating as detector and utilizing an electronic delay line derived from that of FIGURE 5.

Referring now to the drawing wherein like reference numerals are used throughout the various views to designate like parts, and more particularly to FIGURE 1, the electronic delay line illustrated therein is constituted by a tube comprising, within an evacuated envelope 1: a cathode 2 emitting electrons forming a beam 3; an electron-optical system comprising an anode 4 and a negative electrode 5 for directing the beam in the longitudinal direction of the tube; a negative electrode 6, commonly referred to as sole, placed parallel to the beam 3; a first delay circuit portion 7 carried at the anode potential and facing the first portion of the sole 6 on the other side of the beam 3; a positive electrode 8 facing the second portion of the sole 6 and separated galvanically from the circuit 7; a second delay circuit portion 9 facing the third portion of the sole 6 on the other side of the beam 3, separated galvanically from the electrode 8 and carried at the anode potential; and a collector 10 placed at the end of the path of the beam 3.

The input of the delay circuit portion 7 and the output of the delay circuit portion 9 are connected respectively to the coupling devices 11 and 12 of the tube, constituting respectively the input and the output of the electronic delay line.

A transverse magnetic field of which the lines of force are indicated by the circles 13, is furnished of conventional means (not shown) to traverse the inter-electrode space of the tube.

Suitable potentials are applied to the different connections 14, 15, 16, 17, 19, 20 of the electrodes 2, 5, 6, 10, 7, 9 of the tube, to establish within the inter-electrode space a transverse electric field E, defining at the same time as the magnetic field B, the translation velocity of the beam $$v_o = \frac{E}{B}$$

and to permit the production, the concentration and propagation of this beam between the cathode 2 and the collector 10. An adjustable potential is applied by way of the terminal 18 and the rheostat 21 to the electrode 8 to enable adjustment of the translatory velocity $v_e$ within the space between the electrodes 6 and 8.

In this embodiment, one assumes that the delay circuit portions 7 and 9 are utilized on a direct space harmonic, which corresponds to the pulsation of the frequency of utilization $\omega$ greater than the gyromagnetic pulsation $$\omega_c = \frac{e}{m} \cdot B$$

According to the present invention, these portions 7 and 9 are realized in such a manner that the group velocity $v_g$ is at least approximately constant independently of the frequency, and that the relationship be satisfied with the phase velocity $v_p$:

$$v_g = v_p \left(1 - \frac{\omega_c}{\omega}\right)$$

For $\omega > \omega_c$, this relation is satisfied if $v_p$ is of the same sign as $v_g$, which corresponds well to a direct forward wave.

According to another feature of the present invention, the translation velocity of the beam $v_e$ is adjusted to be the same as the group velocity $v_g$.

The conditions enumerated above may be represented in the dispersion diagram $$\frac{c}{v_p} = f(\lambda)$$

where $c$ is the velocity of light and $\lambda$ the operating wave length; by substituting the variable $$= \frac{2\pi c}{\omega}$$

and by introducing the value $$\lambda_c = \frac{2\pi c}{\omega_c}$$

the foregoing equation then presents itself in the following form:

$$\frac{c}{v_p} = \frac{c}{v_e}\left(1 - \frac{\lambda}{\lambda_c}\right)$$

which corresponds to the straight portion AB in the dispersion diagram shown in FIGURE 2.

The delay circuit of the portions 7 and 9 will therefore be realized in such a manner that its dispersion curve corresponds as near as possible and within a band as large as possible to the straight line AB.

As illustrative example, it is assumed that the distance between the electrodes 7 or 9 and 6 is 5/16 cm., and the voltage applied between the connections 19 or 20 and 16 is about 1,000 volts. The field E is then $$\frac{1,000}{5/16} = 3200 \text{ v./cm.} = 3.2 \cdot 10^{11} \text{ u.e.m.}$$

If one takes $\lambda_c = 10$ cm., and $\omega_c = 2\pi \cdot 3{,}000$ mc.; then the field B becomes, with $$\frac{e}{m} = 1.76 \cdot 10^7 \text{ u.e.m.}$$

$$B = \frac{\omega_c}{e/m} = \frac{2\pi \cdot 3000 \cdot 10^6}{1.76 \cdot 10^7} = 1070 \text{ gauss}$$

and the translation velocity of the beam:

$$v_e = \frac{3.2 \cdot 10^{11}}{1070} = 3 \cdot 10^8 \text{ cm./sec.}$$

or $$\frac{c}{v_e} = \frac{3 \cdot 10^{10}}{3 \cdot 10^8} = 100$$

The position of the straight line AB is thus fixed by the points $$\frac{c}{v_e} = 100$$

and $$\lambda_c = 10 \text{ cm.}$$

A delay line of which the dispersion curve corresponds with a good approximation to the straight line AB is the ladder type line with back plate represented in plan view in FIGURE 3 and in transverse cross sectional view in FIGURE 4. There is illustrated in these two FIGURES 3 and 4 a line having a width $D=4$ cm. and a pitch $p=2.25$ mm. (FIG. 3), while the distance between the back plate 22 and the ladder 23 (FIG. 4) is $d=0.5$ mm. The plotting of the dispersion curve of the fundamental mode of this line shows that it has the form CD (FIGURE 2) tangent to the straight line AB at the point corresponding to $\lambda=9$ cm., a wave which one choses as central wave of the operating band. About this central wave, the coincidence between the curve CD and the straight line AB is very close, and experiments show that the obtained pass band, corresponding to an insertion loss of 3 db, represents some hundreds of megacycles.

The tube shown in FIGURE 5 in which the same reference numerals as in FIGURE 1 have been utilized to designate analogous parts, corresponds to the case in which ones desires to utilize a frequency $\omega < \omega_c$, and in which consequently the fast cyclotron wave is backward. In this case, one will utilize for the portions 7 and 9 a delay line with backward propagation on the desired harmonic. Contrary to FIGURE 1, the portions 7 and 9 are placed in alignment with the negative electrode 6 and carried at a negative potential by means of terminals 19 and 20 whereas a positive electrode 8 extends all along the system and is joined to the electron optical anode 4. The rheostat 21 is inserted in the feed connection of the electrode 6 by way of terminal 16. This modification, which has become necessary in the case of the backward wave, corresponds to the necessity of adapting the polarization of the high frequency field of the structure to the polarization of the fast cyclotron wave, that is, to so construct and arrange the same that the high frequency turning electric field acts on the electrons in a sense such that it increases the cyclotron energy of rotation thereof. This adaptation is realized, in the case of the forward cyclotron wave, with the positive delay circuit, and in the case of the backward cyclotron wave with the negative delay circuit. Otherwise, the tube of FIGURE 5 does not differ from that of FIGURE 1.

The relation $$\frac{c}{v_p} = \frac{c}{v_e}\left(1 - \frac{\lambda}{\lambda_c}\right)$$

being satisfied as in the preceding case, but due consideration being given this time to the fact that $\lambda > \lambda_c$, the graphic representation of this relation in the dispersion diagram is that of FIGURE 6, and corresponds to a rising straight line comprising a portion A'B'. By taking $$\lambda_c = 8 \text{ cm. and } \frac{c}{v_e} = 100$$

one arrives by calculations analogous to the preceding example at a value of $B=1{,}340$ gauss and at the distance between portions 7 or 9 and electrode 6 of 1/4 cm. if one desires to maintain the same voltage of 1,000 volts between these electrodes. The straight line A'B' is then defined by these two points.

The delay portions 7 and 9 suitable for this case will be constituted by the interdigital line without backplate shown in FIGURE 7, with width $D=4$ cm. and pitch $p=0.8$ mm. The length L of the wave line portion 7 will preferably be chosen such that the totality of the energy is transferred to the beam at the end of this portion. For example, by choosing the operating wave length $\lambda=10$ cm., one arrives by calculation to $L=7.2$ cm. If this relationship were not satisfied, and if there remained high frequency energy at the end of the portion, it would be necessary to absorb the same by an attenuation. The length of the portion 9 will be chosen on the basis of analogous considerations.

The dispersion curve of the fundamental mode of the line of the type indicated and dimensioned as described above coincides practically with the portion of the straight line A'B'.

The adjustment of the translation velocity $v_e$ within the space between electrodes 6 and 8 takes place in FIGURE 1 as well as in FIGURE 5 by means of the rheostat 21 inserted into the circuit of the electrode 8 or 6, respectively. The beam 3 describes within this space trochoidal trajectories or paths with more or less tight arches depending on the value of the electric field, in such a manner that its translation velocity is adjustable and determines the delay in the transmission of the signal between the input circuit and the output circuit.

By neglecting the losses in the circuit, the band-width corresponding to an insertion loss of 3 db is calculated according to the following expression:

$$\frac{\Delta f}{f} = \frac{2}{3}\left(\frac{\lambda}{\lambda_c} - 1\right)$$

which gives, for $$\lambda = 10 \text{ cm.} \quad \frac{\Delta f}{f} = \frac{1}{6}$$

or 500 mc. for $f=3{,}000$ mc.

These results show the progress realized thanks to the present invention as compared to the known delay lines described hereinabove.

In the case in which one desires to utilize the lines according to the principle described above for the realization of wide-band detectors, the connection thereof assumes the form as shown in FIGURE 8, in which one utilizes a tube derived directly from the embodiment of FIGURE 5, conserving again the same reference numerals for analogous parts.

Thus, the detector according to the present invention comprises, as shown in FIGURE 8, an electronic delay line constituted by a tube of which the elements are, as in FIGURE 5: an evacuated envelope 1; a cathode 2 emitting electrons forming a beam 3; an electron-optical system comprising an anode 4 and a negative electrode 5 to direct the beam in the longitudinal direction of the tube; a negative electrode 6, referred to as sole, placed parallel to the beam 3; a delay circuit portion 7, realized in conformity with the preceding indications, aligned with the sole 6 and carried at a negative potential by the connection 19; an electrode 8 facing the sole 6 and a portion 7 on the other side of the beam 3, this electron being, for example, at the same potential as the anode 4 and being connected and united into a single electrode with this anode; and finally a collector 10 placed at the end of the path of the beam 3.

It will be noted that the output circuit for the high frequency, constituted in FIGURE 5 by a second delay line portion, has been suppressed in this embodiment as not necessary in its new application to detectors.

In conformity with the present invention, a utilization circuit indicated by an impedance 22 separated from the collector by a capacitor 23, is inserted into the collector circuit 10. The output signal is collected at 24 at the terminals of the impedance 22.

As in the preceding embodiments, a transverse magnetic field 13 is applied across the tube, and the connections 14, 15, 16 and 17 and 18 serve to apply suitable potentials to the different electrodes. The input signal is applied through the connection 11 to the delay portion 7.

This device operates as follows:

In the absence of the signal, the beam 3 propagates substantially in a straight line between the electrodes 7 and 8, and begins to describe circles in the space between the electrodes 6 and 8, the translation velocity being thus reduced. By assuming that a high frequency signal modulated with a low frequency is applied to the connection 11, the high frequency energy propagates in the delay line 7 and is transferred cumulatively to the beam 3 with which this line is coupled. The length of the portion 7 is calculated, as indicated hereinabove, in such a manner that at its output extremity, the totality of the energy is transferred to the beam. During this transfer, the electrons begin to describe circles of which the square of the radius is substantially proportional to the energy of rotation, which corresponds to the conversion of the high frequency energy transferred by the coupling. This radius therefore increases during the progression of the beam along the delay line, which is represented by the envelope 25 in dash line, tangent to the successive circles. If the amplitude of the energy at the connection 11 is at the level of a certain threshold which depends on the velocity of the beam 3 and on the inter-electrode distance 7–8, the radius of the circles at the place where the totality of the energy has been transferred to the beam, that is, at the output of the delay line 7, is such that the beam touches more or less one of the electrodes 6 and 8 and is absorbed at least in part by the same. In contrast thereto, it passes freely between the electrodes 6 and 8 during the time intervals of the high frequency period, intervals variable with the low frequency modulation, where the input amplitude decreases below this aforementioned threshold. It results therefrom on the collector 10 sometimes the presence and sometimes the absence or at least a diminution of current, and the variations of this current are transmitted by the capacitor 23 in the impedance 22 which gives rise to an output signal at the connection 24. This signal represents therefore a detection of the input signal with delay due to the transit time of the beam in the drift space. This delay is electronically adjustable by causing the potential of the electrode 6 to vary by means of the rheostat 21.

One thus associates the wide band and high level detection with the possibility of adjusting by electronic means the desired delay applied to the detection.

While I have shown and described several embodiments in accordance with the present invention, it is understood that the same is not limited thereto, but is susceptible of numerous changes and modifications known to a person skilled in the art, and I therefore do not wish to be limited to the details shown and described herein, but intend to cover all such changes and modifications as are encompassed by the scope of the appended claims.

I claim:
1. An electronic delay line which includes a vacuum tube having an evacuated enclosure comprising, within said enclosure:
   delayless wave guide means forming a drift space and provided with input and output means,
   means for establishing crossed transverse electric and magnetic fields within said wave guide means,
   means for producing an electron beam and directing said beam through said input means into said wave guide,
   collector means for said beam after emerging from said output means,
   a geometrically periodic delay line section having dispersive phase velocity characteristics extending at least along a portion of the path of said beam preceding said guide input means,
   and means for energizing said delay line section with a microwave signal,
   the velocity of said beam being adjusted substantially to the group velocity of the wave propagating in said delay line section.

2. An electronic delay line which includes a vacuum tube having an evacuated enclosure comprising, within said enclosure:
   delayless wave guide means forming a drift space and provided with input and output means,
   means for establishing crossed transverse electric and magnetic fields within said wave guide means,
   means for producing an electron beam and directing said beam through said input means into said wave guide,
   collector means for said beam after emerging from said output means,
   a geometrically periodic delay line section extending at least along a portion of the path of said beam preceding said guide input means,
   and means for energizing said delay line section with a microwave signal,
   the velocity of said beam being adjusted substantially to the group velocity of the wave propagating in said delay line section,
   said delay line section having a structure with substantially constant group velocity within a predetermined relatively wide band and with a ratio between said group velocity and the phase velocity of a predetermined space harmonic substantially equal to $$1 - \frac{\omega_c}{\omega}$$

where $\omega$ is substantially the center frequency pulsation of said band, and $\omega_c$ is the gyromagnetic pulsation of said electrons in said transverse magnetic field.

3. An electronic delay line which includes a vacuum tube having an evacuated enclosure comprising, within said enclosure:
   delayless wave guide means forming a drift space and provided with input and output means,
   means for establishing crossed transverse electric and magnetic fields within said wave guide means,
   means for producing an electron beam and directing said beam through said input means into said wave guide,
   collector means for said beam after emerging from said output means,
   a first geometrically periodic delay line section having dispersive phase velocity characteristics extending at least along a portion of said beam preceding said guide input means, a second geometrically periodic delay line section having dispersive phase velocity characteristics extending along a portion of the path of said beam between said output means and said collector means,
means for energizing said delay line section with a microwave signal,
and further output means coupled to said second section for abstracting the delayed signal therefrom,
the velocity of said beam being adjusted substantially to the group velocity of the wave propagating in said delay line section.

4. An electronic delay line which includes a vacuum tube having an evacuated enclosure comprising, within said enclosure:
delayless wave guide means forming a drift space and provided with input and output means,
means for establishing crossed transverse electric and magnetic fields within said wave guide means,
means for producing an electron beam and directing said beam through said input means into said wave guide,
collector means for said beam after emerging from said output means,
a first geometrically periodic delay line section extending at least along a portion of the path of said beam preceding said guide input means,
a second geometrically periodic delay line section extending along a portion of the path of said beam between said output means and said collector means,
means for energizing said delay line section with a microwave signal,
and further output means coupled to said second section for abstracting the delayed signal therefrom,
the velocity of said beam being adjusted substantially to the group velocity of the wave propagating in said delay line section,
said second delay line section having a structure with substantially constant group velocity within a predetermined relatively wide band, and with a ratio between said group velocity and the phase velocity of a predetermined space harmonic equal to $$1 - \frac{\omega_c}{\omega}$$

where $\omega$ is substantially the center frequency pulsation of said band and $\omega_c$ is the gyromagnetic pulsation of said electrons in said transverse magnetic field.

5. An electronic delay line which includes a vacuum tube having an evacuated enclosure comprising, within said enclosure:
delayless wave guide means forming a drift space and provided with input and output means,
means for establishing crossed transverse electric and magnetic fields within said wave guide means,
means for producing an electron beam and directing said beam through said input means into said wave guide,
collector means for said beam after emerging from said output means,
a first geometrically periodic delay line section extending at least along a portion of the path of said beam preceding said guide input means,
a second geometrically periodic delay line section extending along a portion of the path of said beam between said output means and said collector means,
means for energizing said delay line section with a microwave signal,
and further output means coupled to said second section for abstracting the delayed signal therefrom,
the velocity of said beam being adjusted substantially to the group velocity of the wave propagating in said delay line section,
said first and second delay line sections having a structure with substantially constant group velocity within a predetermined relatively wide band, and with a ratio between said group velocity and the phase velocity of a predetermined space harmonic equal to $$1 - \frac{\omega_c}{\omega}$$

where $\omega$ is substantially the center frequency pulsation of said band and $\omega_c$ is the gyromagnetic pulsation of said electrons in said transverse magnetic field.

6. An electronic wide band detector formed by an electronic delay line which includes a vacuum tube having an evacuated enclosure, comprising, within said enclosure:
delayless wave guide means forming a drift space and provided with input and output means,
means for establishing crossed transverse electric and magnetic fields within said wave guide means,
means for producing an electron beam and directing said beam through said input means into said wave guide,
collector means for said beam after emerging from said output means,
a geometrically periodic delay line section having dispersive phase velocity characteristics extending at least along a portion of the path of said beam preceding said guide input means,
means for energizing said delay line section with a microwave signal,
and further output means connected to said collector means for abstracting detected microwave signals therefrom,
the velocity of said beam being adjusted substantially to the group velocity of the wave propagating in said delay line section.

7. An electronic delay line which includes a vacuum tube having an evacuated enclosure comprising, within said enclosure:
delayless wave guide means forming a drift space and provided with input and output means,
means for establishing crossed transverse electric and magnetic fields within said wave guide means,
means for producing an electron beam and directing said beam through said input means into said wave guide,
collector means for said beam after emerging from said output means,
a geometrically periodic delay line section having dispersive phase velocity characteristics extending at least along a portion of the path of said beam preceding said guide input means,
means for energizing said delay line section with a microwave signal,
the velocity of said beam being adjusted substantially to the group velocity of the wave propagating in said delay line section,
and means for adjusting the electric-to-magnetic field strength ratio within said guide means.

8. An electronic delay line which includes a vacuum tube having an evacuated enclosure comprising, within said enclosure:
delayless wave guide means forming a drift space and provided with input and output means,
means for establishing crossed transverse electric and magnetic fields within said wave guide,
means for producing an electron beam and directing said beam through said input means into said wave guide,
collector means for said beam after emerging from said output means,
a geometrically periodic delay line section having dispersive phase velocity characteristics extending at least along a portion of the path of said beam preceding said guide input means and constituting the positive electrode of a pair of electrodes effectively forming a duct for the path of said beam, the negative electrode of said pair of electrodes facing said delay line section, whereby a transverse electric field is established between said pair of electrodes, means for energizing said delay line section with a microwave signal, and means for establishing substantially throughout said duct a transverse magnetic field crossed with said last-mentioned electric field, the velocity of said beam being adjusted substantially to the group velocity of the wave propagating in said delay line section, and said signal having such a frequency and said beam having such a velocity that the fast cyclotron wave propagating within said beam is a forward wave.

9. An electronic delay line which includes a vacuum tube having an evacuated enclosure comprising, within said enclosure:

delayless wave guide means forming a drift space and provided with input and output means, means for establishing crossed transverse electric and magnetic fields within said wave guide, means for producing an electron beam and directing said beam through said input means into said wave guide, collector means for said beam after emerging from said output means, a geometrically periodic delay line section having dispersive phase velocity characteristics extending at least along a portion of the path of said beam preceding said guide input means and constituting the positive electrode of a pair of electrodes effectively forming a duct for the path of said beam, the negative electrode of said pair of electrodes facing said delay line section, whereby a transverse electric field is established between said pair of electrodes, means for energizing said delay line section with a microwave signal, and means for establishing substantially throughout said duct a transverse magnetic field crossed with said last-mentioned electric field, the velocity of said beam being adjusted substantially to the group velocity of the wave propagating in said delay line section, and said signal having such a frequency and said beam having such a velocity that the fast cyclotron wave propagating within said beam is a forward wave, said delay line section being of a ladder-type structure.

10. An electronic delay line which includes a vacuum tube having an evacuated enclosure comprising, within said enclosure:

delayless wave guide means forming a drift space and provided with input and output means, means for establishing crossed transverse electric and magnetic fields within said wave guide means, means for producing an electron beam and directing said beam through said input means into said wave guide, collector means for said beam after emerging from said output means, a geometrically periodic delay line section having dispersive phase velocity characteristics extending at least along a portion of the path of said beam preceding said guide input means and constituting the negative electrode of a pair of electrodes effectively forming a duct for the path of said beam, the positive electrode of said pair of electrodes facing said delay line section whereby a transverse electric field is established between said pair of electrodes, means for energizing said delay line section with a microwave signal, and means for establishing substantially throughout said duct a transverse magnetic field crossed with said last-mentioned electric field, the velocity of said beam being adjusted substantially to the group velocity of the wave propagating in said delay line section, and said signal having such a frequency and said beam having such a velocity that the fast cyclotron wave propagating within said beam is a backward wave.

11. An electronic delay line which includes a vacuum tube having an evacuated enclosure comprising, within said enclosure:

delayless wave guide means forming a drift space and provided with input and output means, means for establishing crossed transverse electric and magnetic fields within said wave guide means, means for producing an electron beam and directing said beam through said input means into said wave guide, collector means for said beam after emerging from said output means, a geometrically periodic delay line section having dispersive phase velocity characteristics extending at least along a portion of the path of said beam preceding said guide input means and constituting the negative electrode of a pair of electrodes effectively forming a duct for the path of said beam, the positive electrode of said pair of electrodes facing said delay line section whereby a transverse electric field is established between said pair of electrodes, means for energizing said delay line section with a microwave signal, and means for establishing substantially throughout said duct a transverse magnetic field crossed with said last-mentioned electric field, the velocity of said beam being adjusted substantially to the group velocity of the wave propagating in said delay line section, and said signal having such a frequency and said beam having such a velocity that the fast cyclotron wave propagating within said beam is a backward wave, said delay line structure being of an interdigital type structure.

12. An electronic delay line which comprises, within an evacuated enclosure:

substantially delayless wave guide means forming drift space, means for producing an electron beam and directing said beam through said drift space, collector means for said beam after emerging from drift space, delay line means having dispersive phase velocity characteristics extending at least along a portion of the path of said beam preceding said drift space, and means to enable energization of said delay line means with a microwave signal, the velocity of said beam being adjusted substantially to the group velocity of the wave propagating in said delay line means.

References Cited
UNITED STATES PATENTS

| | | | |
|---|---|---|---|
| 2,794,936 | 6/1957 | Huber | 315—3.6 |
| 2,933,639 | 4/1960 | Lally | 315—3.6 |
| 3,073,991 | 1/1963 | Osepchuk | 315—3.5 X |
| 3,123,735 | 3/1964 | Hull | 315—3.6 |
| 3,153,742 | 10/1964 | Kluver | 315—3.5 X |
| 3,179,838 | 4/1965 | Adler | 315—3 |
| 3,227,959 | 1/1966 | Kluver | 315—39.3 |

HERMAN KARL SAALBACH, *Primary Examiner.*

ELI LIEBERMAN, *Examiner.*

S. CHATMON, JR., *Assistant Examiner.*